United States Patent Office 3,135,748
Patented June 2, 1964

3,135,748
HETEROCYCLIC SUBSTITUTED CARBODIIMIDES AND METHOD OF PREPARATION
John C. Sheehan, Cambridge, Mass., assignor to Arthur D. Little, Inc., Cambridge, Mass., a corporation of Massachusetts
No Drawing. Continuation of application Ser. No. 766,406, Oct. 10, 1958, now Patent No. 2,938,892, dated May 31, 1960. This application May 27, 1960, Ser. No. 32,080
5 Claims. (Cl. 260—247.1)

This invention relates to a process for the preparation of organic carbodiimides from thioureas invloving the use of substituted organic sulfonic acid halides; and, as well, to new water-soluble, di-substituted monocarbodiimides.

Various organic carbodiimides; such as, for example, 1,3-dicyclohexyl carbodiimide, [Herbeck and Pezzati Ber. 71, 1933 (1938)] and 1,3-diisopropyl carbodiimide, [Schmidt and Striewsky Ber. 74B, 1285 (1941)] have been known for some years. This class of compounds has been more thoroughly investigated since the discovery of the use of the members thereof as condensation agents in the preparation of peptides described by Sheehan and Hess [J. Am. Chem. Soc. 77, 1067 (1955)]. Prior to the latter reported work the principal sources of information concerning carbodiimides and the preparation thereof were Chemical Reviews 53, 145–166 (1953) and Chemistry of Carbon Compounds, vol. III–A, page 205, Elsevier Publishing Company (1954). The preparation of carbodiimides has been carried out, for some years, by treating a di-substituted thiourea with a metallic oxide such as mercuric oxide or lead oxide to produce the organic carbodiimide and the corresponding metal sulfide. This reaction has been recognized in the art as being slow, complex and expensive. It has also been recognized as being characterized by side reactions which suppress the yield of carbodiimide. Some of the disadvantages of the foregoing process have been overcome by the methods described in E. Schmidt et al. U.S. Patent No. 2,656,383; G. Amiard U.S. Patent No. 2,797,240; T. W. Campbell et. al. U.S. Patent No. 2,853,473; and E. Schmidt et al. U.S. Patent No. 2,905,713. However, not all of the disadvantages of the process for the preparation of carbodiimides by treating di-substituted thioureas with a metallic oxide were overcome by later-developed methods.

It is, therefore, the principal object of this invention to overcome the objections to the process for preparing carbodiimides by treating thioureas with a metallic oxide by providing a safe, simple and economical process for the preparation of organic carbodiimides which produces high yields of carbodiimide. A further object of this invention is to provide a process for the preparation of organic carbodiimides which involves desulfurizing a thiourea with a substituted organic sulfonic acid halide. A still further object of this invention is to provide new water-soluble monocarbodiimides. Other objects will appear hereinafter.

The foregoing and other objects of this invention are accomplished by the provision of a process for preparing organic carbodiimides which comprises treating a basic solution of a thiourea with a substituted organic sulfonic acid halide, extracting the organic carbodiimide thus formed in the solution and recovering the carbodiimide from the extract. The reaction involved is based upon the unique property of organic sulfonic acid halides which cause the latter to react with the sulfur substituent of the thiourea and thus form a carbodiimide linkage and the corresponding thiosulfonate.

This invention may be carried out with thioureas, generally, but it is preferred to employ mono- or di-substituted thioureas of the formula:

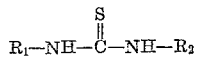

wherein $R_1$ and $R_2$ are monovalent radicals selected from the group consisting of hydrogen, aliphatic and aromatic radicals. The aliphatic radicals which may be substituents in the above formula are normal-, branched- or cyclo-alkyl, preferably containing from 1 to and including 12 carbon atoms, substituted alkyl and alkenyl. Thus, the aliphatic radicals which may be employed as substituents include methyl, ethyl, n-propyl, isopropyl, n-butyl, sec-butyl, isobutyl, tert-butyl, amyl, isohexyl, heptyl, n-octyl, tert-octyl, nonyl, decyl, undecyl, n-dodecyl, cyclohexyl, methoxymethyl, ethoxymethyl, carbethoxy, methoxyethyl, ethoxy, propoxy, diethylaminoethyl, β-diethylaminoethyl, dimethylaminopropyl, diethylaminopropyl, p-diethylaminocyclohexyl, 2-morpholinyl-(4)-ethyl, α-, β-, and γ-piperidyl ethyl, α-, β- and γ-pyridyl methyl and α-, β- and γ-pyridyl ethyl, 1,2,3-trimethyltetrazoline, tetraacetylglucose, α- and β-phenylethyl, benzyl, 1-menthyl, bornyl, trityl, benzoyl, allyl, 2-bromallyl and crotyl. The aromatic radicals which may be substituents in the above general formula include phenyl, p- and m-fluorophenyl, p- and m-chlorophenyl, p- and o-bromophenyl, p- and m-iodophenyl, p- and m-dibromophenyl, 2,4-dibromophenyl, 2,5-dibromophenyl, p- and m-methoxyphenyl, p-isobutylphenyl, p-propylphenyl, p- and o-carbethoxyphenyl, m-cyanophenyl, m-nitrophenyl, p- and m-dimethylaminophenyl, p-diethylaminophenyl, m-acetylphenyl, p-carbo-1-menthoxyphenyl, p-azophenyl, (p-ethoxyphenyl-azo)-phenyl, p-, o- and m-tolyl, α- and β-naphthyl, p-aminobenzenesulfonyl, α-pyridyl and 1-phenanthryl. It is apparent from the foregoing that the substituents, $R_1$ and $R_2$ in the above formula may be normal-, branched-, and cyclo-alkyl containing 1–12 carbon atoms, lower alkenyl, or aryl. The alkyl may be substituted with halogen, lower alkyl, lower alkoxy, di-lower alkylamino, morpholino-, piperidyl- or pyridyl-substituted lower alkyl and monaryl-substituted lower alkyl substituents. The lower alkenyl may have halogen substituents. The aryl radicals may have halogen, cyano, nitro, acetyl, lower alkyl, lower alkoxy and di-lower alkylamino substituents. The substituents $R_1$ and $R_2$ may be the same or different radicals to provide symmetrical and asymmetrical diaryl thioureas, symmetrical and asymmetrical dialkyl or dialkenyl thioureas and mixed aryl and alkyl or alkenyl thioureas.

An organic carbodiimide; and, preferably, an organic monocarbodiimide, is produced in accordance with this invention by reacting a thiourea in a basic solution thereof in an organic solvent with a desulfurizing compound at temperatures in the range of from about 0° C. to about 40° C. Thus, a thiourea is dissolved, preferably, in a water-immiscible organic solvent which is a liquid phase, normally, at temperatures in the range of from about 50° C. to temperatures substantially below 0° C., preferably to about —95° C. The organic solvents which may be employed in this invention include alkyl, aryl, alkaryl, haloalkyl, haloalkylene, haloaryl, ether and ester organic solvents. Thus, organic solvents which have been found suitable for the purposes of this invention include the hydrocarbons, toluene, o-xylene and hexane; the halohydrocarbons, methylene chloride, chloroform, ethylene dichloride and chlorobenzene; the ethers, diethyl ether, diisopropyl ether, anisole, di-n-butyl ether and the esters, ethyl acetate and amyl acetate. The solution of the thiourea is preferably first cooled to a temperature in the range of from about 0° C. to about 40° C. and then made basic to a pH in the range of from 7 to about 10, by adding a basic compound to the solution. The basic compounds which may be employed for this purpose include tertiary amines or alkaline carbonates, preferably, alkali metal carbonates. Thus, the cooled solution of a thiourea in an organic solvent is adjusted to pH 7 to about 10, by adding thereto a basic compound; such as, for example, triethylamine, N-ethylpiperidine, N-methylmorpholine, pyridine, sodium carbonate or potassium carbonate. It is preferred to adjust the pH of the cooled solution of the thiourea to about pH 8 by the foregoing addition of a basic compound. The desulfurizing reagent is then added to the cooled basic solution of the thiourea. The desulfurizing compounds employed in carrying out this invention include alkylsulfonyl halides, monoaryl sulfonyl halides, p-lower alkyl-substituted monoaryl sulfonyl halides and p-halo-substituted monoaryl sulfonyl halides. Thus, to the cooled basic solution of a thiourea there may be added methanesulfonyl chloride, benzenesulfonyl chloride, p-toluenesulfonyl chloride (tosyl chloride) or p-bromobenzyl sulfonyl chloride (brosyl chloride). The use of tosyl chloride or brosyl chloride is preferred in carrying out this invention. The reaction mixture which is thus formed, preferably at a temperature of about 0° C., is agitated by stirring for about one hour while at a temperature of about 0° C. The temperature of the reaction is allowed to rise to room temperature while continuing the stirring and is then stirred for about one hour while the temperature is maintained at room temperature. At the end of this time, the reaction mixture is then subjected to a gentle reflux for about three hours. The reaction between the thiourea and the desulfurizing compound takes place very rapidly at reflux temperatures and there is no need for heating the reaction mixture to higher temperatures. Thus, when the preferred organic solvent, methylene chloride, is employed the reflux temperature is about 42° C.

The refluxed reaction mixture, after the completion of the reaction by the above-described steps, is allowed to cool to room temperature and sufficient water is slowly added thereto to dissolve the reaction products. The reaction mixture is placed under reduced pressure and the organic solvent is thus removed from the reaction mixture. Additional water may then be added to the remaining portion of the reaction mixture, if desired, and the organic monocarbodiimide corresponding to the thiourea employed as a reactant in the above-described reaction is then extracted from the aqueous portion with multiple portions of ether. It is preferred to carry out the reaction between the thiourea and the organic sulfonyl halide under an inert atmosphere; such as, for example, nitrogen, particularly when employing a tertiary amine such as triethylamine as the basic compound in preparing the basic solution of the thiourea.

The organic monocarbodiimide is recovered from the combined ether extracts by distilling the latter. The distillation may be carried out in a Holtzman column. If the carbodiimide produced according to this invention bears a tertiary amino group it is preferred to render it water-soluble. This may be accomplished by neutralizing the said amino group with an acid capable of forming a substantially neutral salt of the tertiary amine. Such acids include the hydrohalic group, hydrogen chloride, hydrogen bromide, and hydrogen iodide, and sulfuric acid, sulfonic acids, nitric acid, phosphoric acid and phosphonic acids. Carboxylic acids are not employed when the resulting carbodiimide is to be used for forming an amide linkage because such acids introduce a carboxyl group into the carbodiimide which functions as a reactant in combining with the amino group of the other reactant to form an amide linkage. Also, carbodiimides produced according to this invention which bear tertiary amino groups may be rendered water-soluble by quaternization with methyl p-toluenesulfonate (methyl tosylate), lower alkyl and aryl halides, methyl bromide, methyl iodide, benzyl bromide, ethyl iodide, ethyl bromide, benzyl iodide, ethyl p-toluenesulfonate (ethyl tosylate), lower alkyl sulfates, methyl sulfate and ethyl sulfate. Other groups which render the carbodiimides water-soluble include sulfonate, sulfates, phosphates, phosphonates, guanidinium, polyhydroxy and polyether groups. Water solubility may also be imparted to the carbodiimide by employing a thiourea having an aliphatic group attached to one of the nitrogen atoms of the

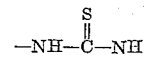

which is of small molecular size or, in addition, contains a polar group. Such groups are ethyl, dimethylaminoethyl, hydroxyethyl and the like. In rendering the carbodiimide water-soluble essentially neutral groups should be employed. Sulfonic acid, carboxylic acid and quaternary ammonium base groups are exampels of groups that are often too acid or too basic to be employed directly in the carbodiimides of the present invention.

In preparing water-soluble carbodiimides produced according to this invention, the ether is removed from the combined ether extracts obtained as described hereinabove. The residue thus obtained is dissolved in ether and dried over magnesium sulfate. The solution obtained is filtered and a mole equivalent of the solubilizing compound; such as for example, methyl iodide dissolved in ether is added to the solution dropwise. The mixture obtained is stirred for about one hour and then cooled to about 0° C. The cooled mixture is allowed to stand for about twelve hours and the water-soluble carbodiimide is separated from the mixture.

The reactions employed in carrying out this invention are conducted, preferably, in mole ratios of 2 moles of the lower alkyl or arylsulfonyl halide to one mole of the thiourea. These reactions are according to the following equations:

(I)

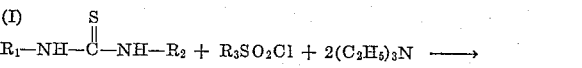

(II)

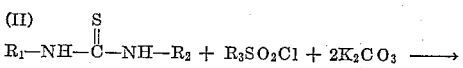

where $R_1$ and $R_2$ are as described above and $R_3$ is lower alkyl, monoaryl, lower alkyl-substituted monoaryl or lower halo-substituted monoaryl, preferably p-lower alkyl-substituted monoaryl and p-halo-substituted monoaryl.

The best mode devised for carrying out this invention is set forth in the following examples:

*Example I*

To a solution of 8.00 g. (0.04 mole) of 1-cyclohexyl-3-propyl thiourea in 200 ml. of methylene chloride and 84 ml. of triethylamine was added at 0° C., 20.44 g. (0.08 mole) of p-bromobenzenesulfonyl chloride (brosyl chloride). This reaction mixture was stirred at 0° C. for 1 hour; and, while continuing the stirring, the temperature of the mixture was allowed to rise to room temperature. The stirring was continued for 1 hour while the mixture was at room temperature. The mixture was then subjected to gentle reflux for 3 hours. This reaction was conducted under an atmosphere of nitrogen. When the reaction was complete 25 ml. of water was added slowly and the mixture thus obtained subjected to reduced pressure to remove the methylene chloride. The mixture remaining after the removal of the methylene chloride was diluted with an additional 10 ml. of water which was then extracted with 9, 25 ml. portions of ether. The extracts were combined and decolorized with activated charcoal, filtered and the ethereal extracts of the residue were distilled in a Holtzman column and 1-cyclohexyl-3-propyl monocarbodiimide was recovered. B.P. 72°/1.2 mm.; $N_D^{25}$ 1.4800; 77% yield.

Example II

To a solution of 4.87 (0.02 mole) of 1-cyclohexyl-3-(3-dimethylaminopropyl) thiourea in 100 ml. of methylene chloride was added a solution of 41.4 g. (0.30 mole) of potassium carbonate in 80 ml. of water. This mixture was cooled to 0° C. and 10.22 g. (0.04 mole) of p-bromobenzenesulfonyl chloride (brosyl chloride) was added thereto. The reaction mixture thus obtained was stirred at 0° C. for 1 hour, allowed to warm to room temperature while continuing the stirring and was then stirred for 1 hour while maintained at room temperature. The mixture was then subjected to gentle refluxing for 3 hours. The mixture was allowed to cool and 25 ml. of water was added slowly. The pressure on the mixture was reduced to remove the methylene chloride and 10 ml. of water was then added to the residue. The latter was extracted with 10, 50 ml. portions of ether, the extracts combined and the ether removed therefrom. The residue obtained was redissolved in another 50 ml. portion of ether and dried over magnesium sulfate. The solution thus obtained was filtered and 4.26 g. (0.03 mole) of methyl iodide in 25 ml. of ether was added thereto dropwise. The mixture was stirred for 1 hour and cooled to 0° C. The product, 1-cyclohexyl-3-(3-dimethylaminopropyl) carbodiimide methiodide was separated from the mixture. This product had a melting point of 157–158° C. and a yield of 87% was obtained.

Example III

The procedure of Example I was carried out employing 1-cyclohexyl-3-(3-dimethylaminopropyl) thiourea as the thiourea reactant. The combined ether extracts of the residue of the reaction mixture obtained after the removal of the methylene chloride were treated, however, according to the procedure of Example II to form the methiodide. The product obtained was 1-cyclohexyl-3-(3-dimethylaminopropyl) carbodiimide methiodie having a melting point of 153–154° C.

Example IV

The procedure of Example I was carried out employing 1-ethyl-3-propyl thiourea as the thiourea reactant. The product obtained was 1-ethyl-3-propyl carbodiimide having a boiling point of 35–36° C. at 7.5 mm.; $N_D^{25}$ 1.4410 and a yield of 42% was obtained.

Example V

The procedure of Example I was carried out employing 1-tert-butyl-3-propyl thiourea as the thioureau reactant. The product obtained was 1-tert-butyl-3-propyl carbodiimide having a boiling point of 67–68° C. at 22.5 mm.; $N_D^{25}$ 1.4350 and a yield of 48% was obtained.

Example VI

The procedure of Example I was carried out employing various symmetrical and asymmetrical alkyl and aryl thioureas and mixed alkyl-aryl thioureas to produce the corresponding carbodiimides. The procedure of Example II was carried out, in turn, to produce the corresponding water-soluble carbodiimides. The products obtained were as follows:

1-ethyl-3-(3-dimethylaminopropyl) carbodiimide methiodide—melting point 106–107.5° C.
1,3-di-tert-butyl carbodiimide—boiling point 52–53° C. at 10 mm.
1-tert-butyl-3-(3-dimethylaminopropyl) carbodiimide methiodide—melting point 145–145.6° C.
1-cyclohexyl-3-(β-diethylaminoethyl) carbodiimide—boiling point 100° C. at 0.05 mm.
1-cyclohexyl-3-(3-dimethylaminopropyl) carbodiimide metho p-toluenesulfonate—melting point 164.4–165.4° C.
1-cyclohexyl-3-(4-diethylaminocyclohexyl) carbodiimide—boiling point 140° C. at 0.03 mm.
1-cyclohexyl-3-(4-diethylaminocyclohexyl) carbodiimide metho p-toluenesulfonate. Anal. calcd. for $C_{25}H_{41}N_3O_3S$ C, 64.78; H, 8.85; N, 9.07; found: C, 64.58; H, 8.71; N, 9.14.
1-(β-diethylaminoethyl)-3-ethylcarbodiimide—boiling point 70° C. at 0.05 mm.
1,3-di-(4-diethylaminocyclohexyl) carbodiimide—boiling point 180° C. at 0.03 mm. Anal. calcd. for $C_{21}H_{40}N_4$: C, 72.36; H, 11.57; N, 16.08; found: C, 72.25; H, 11.50; N, 16.34.
1-phenyl-3-(3-dimethylaminopropyl) carbodiimide methiodide—melting point 172.4–173.4° C.
1-phenyl-3-(3-dimethylaminopropyl) carbodiimide metho p-toluenesulfonate—melting point 183–184° C.
1-(1-naphthyl)-3-(3-dimethylaminopropyl) carbodiimide methiodide—melting point (crude) 139–146° C.

The principles of this invention may also be carried out to produce new carbodiimides which are especially useful in forming peptide bonds according to the methods reported by Sheehan and Hess, J. Am. Chem. Soc. 77, 1067 (1955); Sheehan and Hlavka, J. Org. Chem. 21, 439 (1956) and Sheehan and Hlavka, J. Am. Chem. Soc. 79, 4528 (1957). These new carbodiimides may be produced either by this invention or by prior known methods and have the general formula $$R_1—N=C=N—R_2$$

wherein one of the monovalent radicals $R_1$ or $R_2$ is either morpholinyl-, α-, β-, γ-piperidyl- or α-, β-, γ-pyridyl-substituted lower alkyl. Thus, one of the monovalent radicals $R_1$ or $R_2$ is 2-morpholinyl-(4)-ethyl; α-, β- or γ-piperidyl ethyl; α-, β- or γ-piperidyl methyl or α-, β- or γ-pyridyl ethyl. The remaining monovalent radical $R_1$ or $R_2$ is either an aliphatic or aromatic radical as described hereinabove with reference to the thiourea reactant.

The preparation of the particular foregoing carbodiimides is set forth in the following examples:

Example VII

*1 - cyclohexyl - 3 - [2-morpholinyl - (4) - ethyl] carbodiimide.*—A mixture of 40 g. (0.0147 mole) of 1-cyclohexyl-3-2[2-morpholinyl-(4)-ethyl] thiourea and 6.0 g. of mercuric oxide (Merck yellow) in 50 ml. of acetone was heated (magnetic stirrer) under reflux for 6 hours. The mercuric sulfide formed, was removed by filtration, a second 6 g. portion of mercuric oxide was added, and the suspension was heated at reflux for another 6 hours. The reaction mixture was again filtered and the filtrate concentrated under reduced pressure. The oily residue was evaporatively distilled at 140° C./0.2 mm.; yield, 2.4 g. (70%).

*Analysis.*—Calcd. for $C_{13}H_{22}N_2O$: C, 65.78; H, 9.77; N, 17.71. Found: C, 65.60; H, 9.59; N, 17.71.

Example VIII

*1 - cyclohexyl - 3 - [2 - morpholinyl - (4) - ethyl] - carbodiimide metho-p-toluenesulfonate.*—A mixture of 0.5 g. (2.1 moles) of 1-cyclohexyl-3-[2-morpholinyl-(4)-ethyl]carbodiimide and 0.39 g. (2.1 mole) of methyl p-toluenesulfonate was heated on a steam bath for 20 minutes. A solution in benzene of the reaction mixture deposited the crystalline quaternary salt, 0.6 g. (68%), M.P. 113–115° C.

*Analysis.*—Calcd. for $C_{21}H_{33}O_4N_3S$: C, 59.57; H, 7.80, N, 9.93. Found: C, 59.58; H, 8.05; N, 9.88.

In a second experiment the reaction product was not distilled but was used directly in the preparation of the quaternary salt with an overall yield of 70%.

Example IX

*1 - ethyl - 3 - [2 - morpholinyl - (4) - ethyl] carbodiimide.*—A mixture of 54.2 g. (0.25 mole) of 1-ethyl-3-[2-morpholinyl-(4)-ethyl] thiourea and 54.0 g. (0.25 mole)

of freshly-dried mercuric oxide (Merck yellow) in 500 ml. of dry acetone was stirred at room temperature for 12 hours. The mercuric sulfide which formed was removed by filtration. This process was repeated with two 27.0-g. portions of mercuric oxide, the final mixture being treated with activated carbon before filtration. The colorless filtrate was concentrated under reduced pressure to a pale orange oil, 42.1 g. (92%).

Flash distillation through a short-path still (oil bath 135° C.; 0.2 mm.) gave 22.625 g. (50%) of colorless carbodiimide; $n_D^{25}$ 1.4944;

$$d_{25}^{25}\ 1.0235$$

*Example X*

1 - ethyl - 3 - [2 - morpholinyl - (4) - ethyl] carbodiimide metho-p-toluenesulfonate.—A mixture of the basic carbodiimide (3.27 g.; 0.018 mole) and methyl p-toluenesulfonate (3.32 g.; 0.18 mole) and methyl p-toluenesulfonate (3.32 g.; 0.018 mole) was heated with constant swirling on a steam bath for 5 minutes. The resulting viscous, orange oil was crystallized from acetone-benzene to 4.2 g. (64%) of colorless quaternary carbodiimide, M.P. 91.5–92.5° C.

*Example XI*

1 - ethyl - 3 - [2 - morpholinyl - (4) - ethyl] carbodiimide.—Two grams (0.0098 mole) of 1-ethyl-3-[2-morpholinyl-(4)-ethyl urea (from ethyl isocyanate and the amine) and 3.82 g. (0.02 mole) of p-toluenesulfonyl chloride were mixed slowly with 5.5 ml. pyridine (reagent) in 20 ml. dry methylene chloride with stirring at 0° C. The resulting yellow solution was refluxed gently for a period of 4 hours with stirring.

The solution was then added slowly to 20 g. of ice and 2 g. of sodium carbonate. Additional sodium carbonate was added as the mixture was added to the ice, so that at all times the pH of the solution was somewhat above 7. The final pH of the mixture was 8. The product was immediately extracted with three 30-ml. portions of methylene chloride. This extract was filtered through sodium sulfate and dried over sodium sulfate.

The solvent was removed by warming at 2 mm. Hg. The residual orange oil was distilled with $N_2$ ebullition at 1.5 mm., B.P. 100–105° C., yield 0.37 g., 20% of the colorless product, 1-ethyl-3-[2-morpholinyl-(4)-ethyl] carbodiimide.

*Example XII*

1 - ethyl - 3 - [2 - morpholinyl - (4) - ethyl] carbodiimide hydrochloride.—To a cooled (0.5° C.) solution of the basic carbodiimide, 1-ethyl-3-[2-morpholinyl-(4)-ethyl] carbodiimide (3.27 g.; 0.018 mole), in 20 ml. of anhydrous ether was added slowly 0.017 mole of hydrogen chloride in 10 ml. of ether. After removal of solvent the water-soluble carbodiimide salt, 1-ethyl-3-[2-morpholinyl-(4)-ethyl] carbodiimide hydrochloride, is used without further purification.

*Example XIII*

1 - ethyl - 3 - [2 - morpholinyl - (4) - ethyl] carbodiimide sulfate.—To a cooled (0.5° C.) mixture of the basic carbodiimide, 1-ethyl-3-[2-morpholinyl-(4)-ethyl] carbodiimide (3.27 g.; 0.018 mole), and 20 ml. of water was added 0.017 mole of N-sulfuric acid. The solution was immediately lyophilized. The resulting semi-solid, 1-ethyl-3-[2-morpholinyl-(4)-ethyl] carbodiimide sulfate, used for amide condensations without further purification. Alternatively, the aqueous solution prepared is used to effect the cross-linking of gelatin.

The principles of this invention may be carried out to produce the known carbodiimides. Typical known organic monocarbodiimides which may be produced by the methods of Examples I and II, above, include the symmetrical diaryl carbodiimides, diphenyl carbodiimide; di-p-, di-o-, and di-m-tolyl carbodiimide; di-p- and di-m-fluorophenyl carbodiimide; di-p- and di-m-chlorophenyl carbodiimide; di-p-, di-m- and di-o-bromophenyl carbodiimide; di-(2,4-dibromophenyl) and di-(2,5-dibromophenyl) carbodiimide; di-p- and di-m-iodophenylcarbodiimide; di-m-cyanophenyl carbodiimide; di-m-nitro phenyl carbodiimide; di-(p-dimethyl aminophenyl), di-(m-dimethyl aminophenyl), and di-(p-diethylaminophenyl) carbodiimide; di-(p-methoxyphenyl), di-(m-methoxyphenyl) carbodiimide; di-m-acetylphenyl carbodiimide; di-p-carbethoxyphenyl carbodiimide; di-p-carbo-1-methoxyphenyl carbodiimide; di-(p-ethoxyphenyl azo)-phenyl carbodiimide; di-alpha- and di-beta-naphthyl carbodiimide; the asymmetric diaryl carbodiimides having as 1,3-substituents 1-phenyl-3-p-tolyl, 1-phenyl-3-p-chlorophenyl, 1-phenyl-3-p-bromophenyl, 1-phenyl-3-p-dimethylamino phenyl, 1-phenyl-3-p-azophenyl phenyl, 1-phenyl-3-(1)-phenanthryl, 1-p-chlorophenyl-3-p-tolyl and 1-p-bromophenyl-3-p-tolyl; the symmetrical aliphtaic carbodiimides wherein the 1,3-substituents are dimethyl-, diethyl-, dipropyl-, di-isopropyl-, di-n-butyl-, di-isobutyl-, di-sec-butyl-, diallyl-, di-tert-butyl-, dicyclohexyl-, dibenzyl-, di-n-octyl-, di-tert-octyl-, di-p-diethyl-aminocyclohexyl-, di-1-menthyl-, di-bornyl-, and dirityl; the asymmetrical aliphatic carbodiimides wherein the 1,3-substituents are 1-methyl-3-propyl, 1-methyl-3-methoxymethyl, 1-methyl-3-isopropyl, 1-methyl-3-ethoxymethyl, 1-methyl-3-carbethoxy, 1-methyl-3-tert-butyl, 1-ethyl-3-propyl, 1-ethyl-3-methoxyethyl, 1-propyl-3-methoxy-methyl, 1-propyl-3-isopropyl, 1-propyl-3-(2-bromoallyl)- 1-propyl-3-tert-butyl, 1-propyl-3-dimethylaminopropyl, 1-propyl-3-cyclohexyl, 1-isopropyl-3-methoxymethyl, 1-isopropyl-3-(2-bromoallyl), 1-isopropyl-3-ethoxymethyl, 1-isopropyl-3-tert-butyl, 1-isopropyl-3-dimethylaminopropyl, 1-isopropyl-3-cyclohexyl, 1-isopropyl-3-n-dodecyl, 1-n-butyl-3-cyclohexyl, 1-tert-butyl-3-(2-bromoallyl) 1-tert butyl-3-dimethylaminopropyl, 1-tert-butyl-3-cyclohexyl, 1-cyclohexyl-3-methoxymethyl, 1-cyclohexyl-3-ethoxymethyl, 1-cyclohexyl-3-(2-bromoallyl), 1-cyclohexyl-3-diethylaminoethyl, 1-cyclohexyl-3-(4-diethylaminocyclohexyl), 1-benzyl-3-trityl, 1-allyl-3-ethoxy, 1-allyl-3-propoxy, 1-H-3-trityl, 1-allyl-3-trityl, 1-isohexyl-3-methoxymethyl, 1-dimethylaminopropyl-3-methoxymethyl, 1-dimethylaminopropyl-3-(2-bromoallyl), and 1-benzoyl-3-(2-benzoyloxyethyl); the mixed aryl-aliphatic carbodiimides wherein the 1,3-substituents are 1-phenyl-3-H, 1-phenyl-3-methyl, 1-phenyl-3-allyl, 1-phenyl-3-cyclohexyl, 1-phenyl-3-trityl, 1-phenyl-3-n-dodecyl, 1-phenyl-3-(1,2,3-trimethyltetrazoline), 1-p-tolyl-3-H, 1-p-chlorophenyl-3-isopropyl, 1-p-methoxyphenyl-3-propyl, 1-o-carbethoxyphenyl-3-methyl, 1-p-carbethoxyphenyl-3-tetraacetylglucose, 1-p-dimethylaminophenyl-3-cyclohexyl, 1-p-dimethylaminophenyl-3-1-menthyl, 1-p-dimethylaminophenyl-3-bornyl, 1-alpha-naphthyl-3-methoxypropyl, and 1-p-aminobenzenesulfonyl-3-H; and the neutral, water-soluble quaternary salts of the foregoing carbodiimides having a tertiary amino group combined with a hydrohalic group, sulfuric acid, sulfonic acids, nitric acid, phosphoric acid, phosphonic acids, methyl tosylate, ethyl tosylate, lower alkyl halides, benzyl halides or lower alkyl sulfates.

This application is a continuation of application Serial No. 766,406, filed October 10, 1958, U.S. Patent No. 2,938,892, which is a continuation-in-part of application Serial No. 641,853, filed February 25, 1957, now abandoned, which is, in turn, a continuation-in-part of application Serial No. 551,531, filed December 2, 1955, now abandoned, each of which earlier applications disclose the organic carbodiimides claimed herein; and, as well, discloses examples of the uses of organic carbodiimides prepared according to the methods disclosed herein. This application, accordingly, relies upon the disclosure of the said earlier-filed applications and the disclosure of each of said applications is incorporated by reference into the present application.

I claim:
1. A compound of the group consisting of an organic monocarbodiimide having the formula:

$$R_1-N=C=N-R_2$$

wherein one of the monovalent radicals $R_1$ and $R_2$ is a member selected from the group consisting of morpholinyl-, piperdyl-, and pyridyl-substituted lower alkyl and the remaining monovalent radical is a member selected from the group consisting of an aryl radical selected from the group consisting of phenyl, p- and m-fluorophenyl, p- and m-chlorophenyl, p- and o-bromophenyl, p- and m-iodophenyl, p- and m-dibromophenyl, 2,4-dibromophenyl, 2,5-dibromophenyl, p- and m-methoxyphenyl, p-isobutylphenyl, p-propylphenyl, p- and o-carbethoxyphenyl, m-cyanophenyl, m-nitrophenyl- p- and m-dimethylaminophenyl, p-diethylaminophenyl, m-acetylphenyl, p-carbo-1-menthoxyphenyl, p-azophenyl, (p-ethoxyphenylazo)-phenyl, p-, o- and m-tolyl, α- and β-naphthyl, p-aminobenzenesulfonyl, α-pyridyl and 1-phenanthryl; an alkyl radical containing 1–12 carbon atoms; substituted alkyl containing 1–12 carbon atoms, said alkyl substituents being selected from the group consisting of halogen, lower alkyl, lower alkoxy, di-lower alkylamino, morpholino-, piperidyl-, and pyridyl-substituted lower alkyl, α- and β-phenylethyl, benzyl, and trityl; allyl and 2-bromoallyl; the non-toxic pharmaceutically acceptable acid addition salts thereof and the mono-quaternary ammonium salts thereof wherein the quaternizing agent is selected from the group consisting of methyl p-toluenesulfonate, ethyl p-toluenesulfonate, lower alkyl halides, lower alkyl sulfates and benzyl halides.
2. 1-Ethyl-3-(2-morpholinyl-(4)-ethyl) carbodiimide.
3. 1-Cyclohexyl-3-(2-morpholinyl-(4)-ethyl) carbodiimide.
4. 1-Ethyl-3-(2-morpholinyl-(4)-ethyl) carbodiimide metho-p-toluenesulfonate.
5. 1-Cyclohexyl-3-(2-morpholinyl-(4)-ethyl) carbodiimide metho-p-toluenesulfonate.

References Cited in the file of this patent

UNITED STATES PATENTS

| | | |
|---|---|---|
| 2,797,240 | Amiard et al. | June 25, 1957 |
| 2,801,911 | Gilbert et al. | Aug. 6, 1957 |
| 2,850,529 | Pinson | Sept. 2, 1958 |
| 2,905,713 | Schmidt et al. | Sept. 22, 1959 |

FOREIGN PATENTS

| | | |
|---|---|---|
| 1,131,266 | France | Oct. 15, 1956 |

OTHER REFERENCES

Amiard et al.: Bulletin de la Societe Chimique de France (1956), page 1360.
Sheehan et al.: Journal of Organic Chemistry, vol. 21, pages 439–444 (1956).
Sheehan et al.: Journal of the American Chemical Society, vol. 79, pages 4528–4529 (1957).
Schmidt et al.: Justus Liebig's Annalen, vol. 612; page 19 (1958).